United States Patent
Xie et al.

(10) Patent No.: US 9,685,989 B1
(45) Date of Patent: Jun. 20, 2017

(54) RADIO FREQUENCY POWER OUTPUT CONTROL AND DETECTION FOR ELECTRONICALLY SCANNED ARRAY SYSTEM

(71) Applicant: Rockwell Collins, Inc., Cedar Rapids, IA (US)

(72) Inventors: Chenggang Xie, Marion, IA (US); Anders P. Walker, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 15/012,411

(22) Filed: Feb. 1, 2016

(51) Int. Cl.
*H04B 1/44* (2006.01)
*H04B 17/00* (2015.01)

(52) U.S. Cl.
CPC ..................................... *H04B 1/44* (2013.01)

(58) Field of Classification Search
CPC ... H04B 1/38; H04B 1/44; H04B 1/48; H04B 1/109; H04B 1/525; H04B 1/1027; H04B 7/0413; H04B 15/00
USPC ... 455/63.1, 67.11, 67.13, 78, 82, 83, 114.2, 455/115.1, 423, 424; 342/367, 371, 372
See application file for complete search history.

(56) References Cited

U.S. PATENT DOCUMENTS

| | | | |
|---|---|---|---|
| 6,686,885 B1 * | 2/2004 | Barkdoll | H01P 1/184 342/372 |
| 8,175,535 B2 * | 5/2012 | Mu | H04B 1/123 455/63.1 |
| 9,118,398 B1 * | 8/2015 | Han | H03K 3/012 |
| 9,148,137 B2 * | 9/2015 | van Wanum | H03K 17/693 |

* cited by examiner

*Primary Examiner* — Quochien B Vuong
(74) *Attorney, Agent, or Firm* — Angel N. Gerdzhikov; Donna P. Suchy; Daniel M. Barbieri

(57) ABSTRACT

Electronically scanned array antenna radiating elements include a phase comparator. The phase comparator connects the transmission circuitry to the receiving circuitry via a shunt switch to compare the intended phase with the actual phase. The phase of a signal received via the shunt switch is sensitive to the performance of power amplifiers in the transmission circuitry, transmitter/receiver switch, and load impedance. Distributed attenuators between the shunt switch and a phase comparator reduce crosstalk. Phase comparison circuitry is useful for detecting faults in the ESA radiating element.

17 Claims, 4 Drawing Sheets

RADIO FREQUENCY POWER OUTPUT CONTROL AND DETECTION FOR ELECTRONICALLY SCANNED ARRAY SYSTEM

BACKGROUND

Electronically scanned array (ESA) systems rely on precise phase disparity between radiating elements to produce a directional beam. Especially in aviation and military applications, precise phase and amplitude control of each radiating element is critical to meet point angle, beam width, and sidelobe requirements.

As the power amplifier is driven into the compression region and the output power of the power amplifier is saturated, phase distortion of the power output (AM-PM distortion) becomes significant. The phase of radio frequency (RF) output at the 1 dB compression point is about 22 degree deviated from the phase in the linear region for a 2 W amplifier design. Power output in saturation is less sensitive to input power; however, the output phase becomes much more sensitive to input power. For amplitude taper, the phase of RF output from elements at different power levels in the compression region including saturation may be significantly different as compared to that from elements at much lower power levels in the linear region. The phase imbalance among the elements must be minimized in order to meet high performance system requirements.

Calibration methodology based on a table of calibration values (open loop control) cannot accurately control phase to meet high performance requirements when the amplifier is in the compression region. In the compression region, one dB input power variation could cause a phase shift of about 3-4 degrees. In order to achieve 0.5 degree phase accuracy of a high performance ESA system, the calibration method must have 0.25 dB accuracy to control the RF input power. When the amplifier enters saturation, phase shift per dB accelerates substantially. In practice accurately controlling the phase and amplitude at each element is difficult.

SUMMARY

Accordingly, embodiments of the inventive concepts disclosed herein are directed to a novel method and apparatus for adjusting phase modulation of radiating elements in an ESA.

In one aspect, embodiments of the inventive concepts disclosed herein are directed to an ESA radiating element which includes a phase comparator feedback loop. The feedback loop connects the transmission circuitry to the receiving circuitry via a shunt switch to compare the intended phase with the actual phase. A signal received via the shunt switch is sensitive to the performance of the power amplifier, transmitter/receiver switch, and load impedance.

In some embodiments, distributed attenuators between the shunt switch and a phase comparator reduce crosstalk.

In some embodiments, phase comparison circuitry is useful for detecting faults in the ESA radiating element.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Reference will now be made in detail to the subject matter disclosed, which is illustrated in the accompanying drawings. The scope of the inventive concepts disclosed herein is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
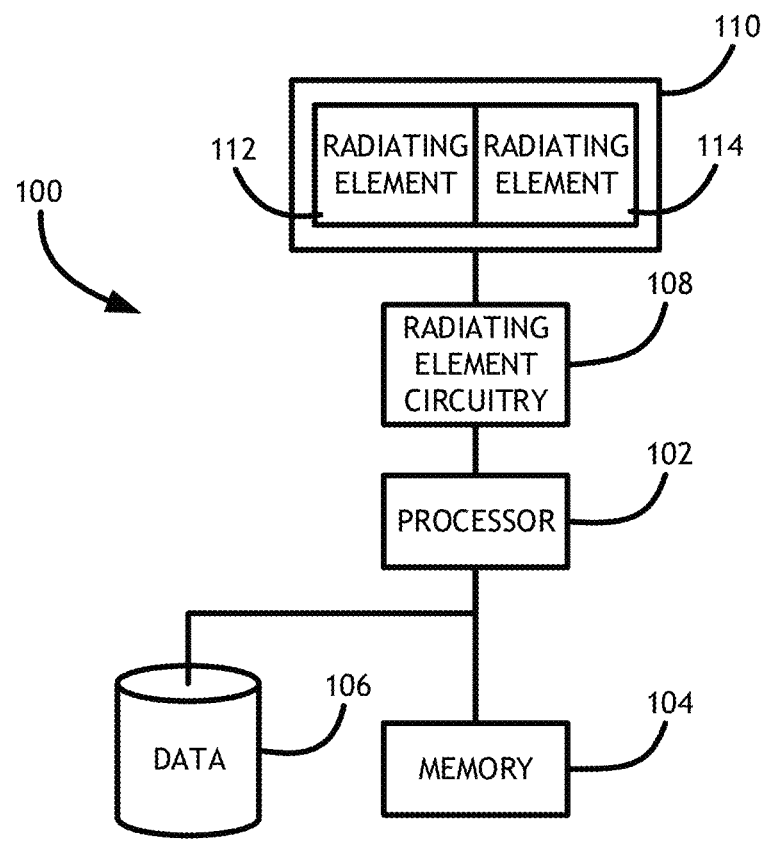
FIG. 1 shows a block diagram of a communication system according to one embodiment of the inventive concepts disclosed herein.

Referring to FIG. 1, a block diagram of a communication system 100 according to one embodiment of the inventive concepts disclosed herein is shown. The communication system 100 comprises a processor 102 connected to a plurality of radiating elements 112 and 114 in an ESA 110 via radiating element circuitry 108 comprising transmitter, receiver, and sampling circuitry associated with each radiating element. The processor 102 is further connected to a memory element 104 for storing processor executable code.

In one embodiment, the radiating element circuitry 108 comprises a phase comparator to create a feedback loop that modifies the phase of a signal as more fully described herein. In some embodiment, the processor 102 is configured to receive a leakage RF power signal from the radiating element circuitry 108 while in a transmit mode and modify signals received by the radiating element circuitry 108 accordingly.

In one embodiment, the processor 102 may also be connected to a data storage element 106 for storing base line reference values for a radiating element calibration process.

Figure 2:
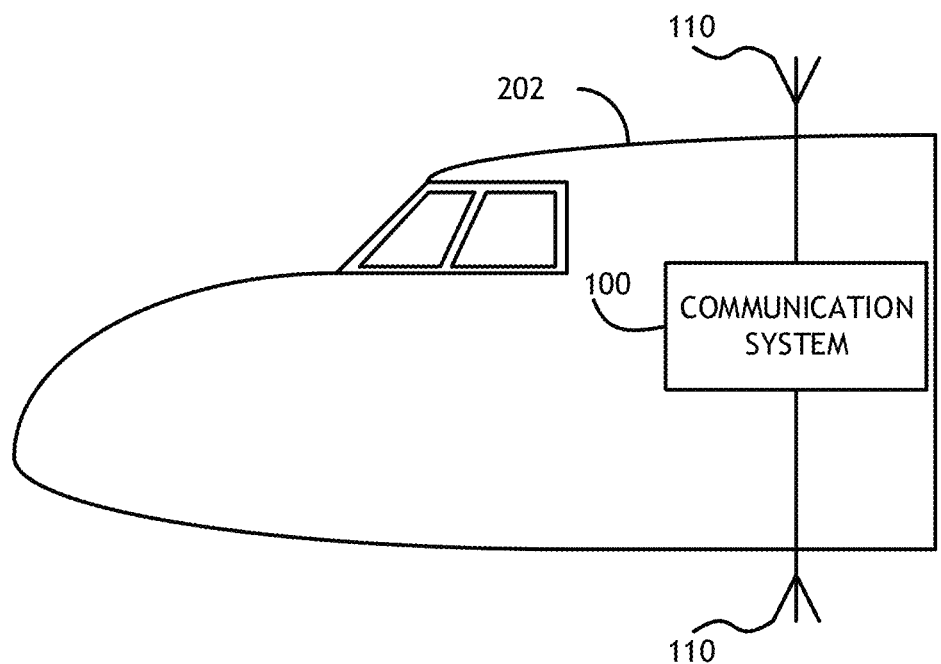
FIG. 2 shows an environmental view of one embodiment of a communication system according to the inventive concepts disclosed herein.

Referring to FIG. 2, an environmental view of one embodiment of a communication system 100 incorporated into an aircraft 202 according to the inventive concepts disclosed herein is shown. The aircraft 202 includes a communication system 100 comprising processing elements connected to one or more ESAs 110.

In one embodiment, the communication system 100 is configured, either via software or specialized hardware, to receive signals through radiating element receiver circuitry corresponding to signals generated by radiating element transmitter circuitry, and compare the phase of the received signals to the projected phase of the signals sent to the transmitter circuitry. In some embodiments, each radiating element in at least one of the one or more ESAs 110 comprises phase comparator circuitry connecting the transmitter circuitry to the receiver circuitry in a feedback loop such that the phase comparator circuitry determines a phase disparity and alters the transmitter circuitry accordingly.

Figure 3:
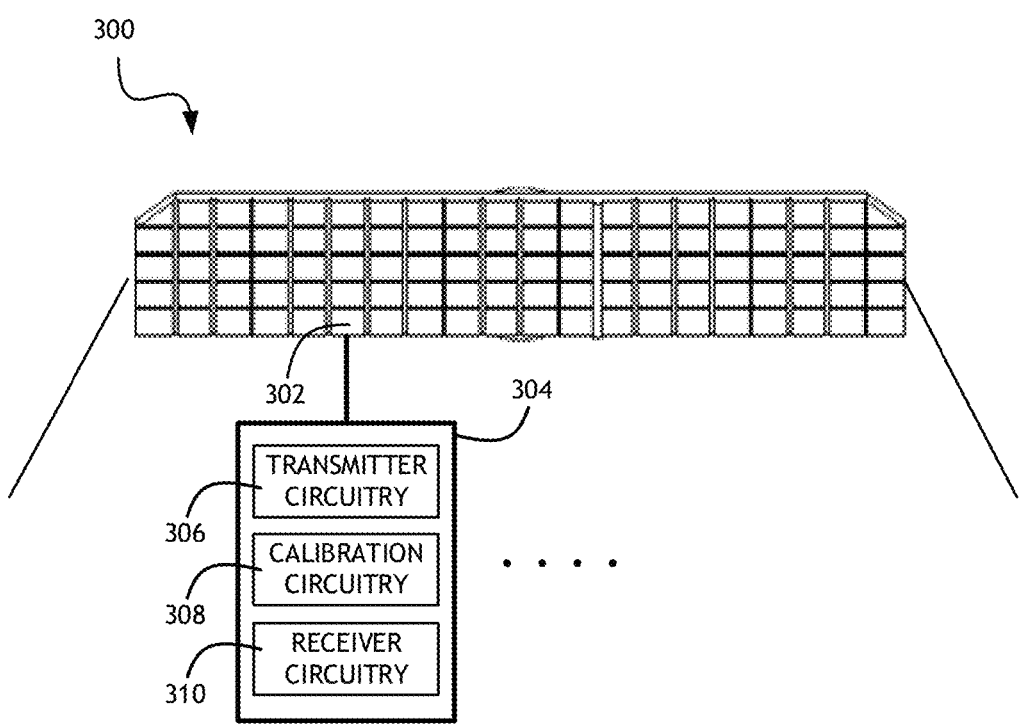
FIG. 3 shows an ESA according to one embodiment of the inventive concepts disclosed herein.

Referring to FIG. 3, an ESA 300 according to one embodiment of the inventive concepts disclosed herein is shown. The ESA 300 comprises a plurality of radiating elements 302, each radiating element 302 connected to radiating element circuitry 304 comprising transmitter circuitry 306, receiver circuitry 310, and calibration circuitry 308 for periodically or continuously adjusting the phase of signals sent via the transmitter circuitry 306 to adjust the directionality of the signal sent by the ESA 300.

Figure 4:
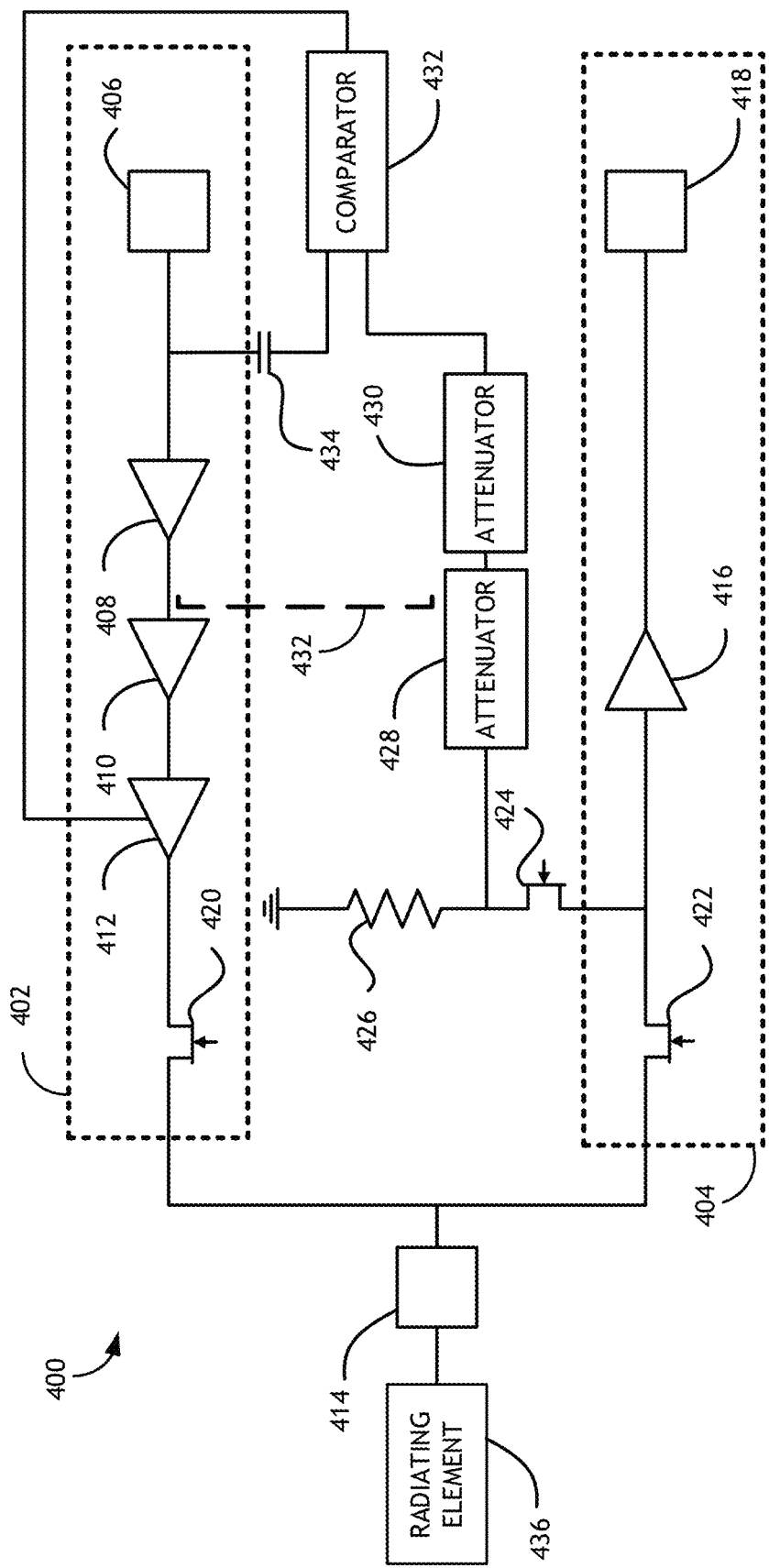
FIG. 4 shows a diagram of a circuit according to one embodiment of to the inventive concepts disclosed herein.

Referring to FIG. 4, a diagram of a circuit 400 according to one embodiment of to the inventive concepts disclosed herein is shown. The circuit comprises a transmitter branch 402 and a receiver branch 404. The transmitter branch 402 receives signals to transmit via a transmitter contact pad 406; such signal received via the transmitter contact pad 406 is amplified by one or more transmitter amplifiers 408, 410, and 412. The amplified signal is delivered to a radiating element contact pad 414, and thereby applied to a connected radiating element 436 to produce a desired radiation pattern in concert with other radiating elements in an ESA. The receiver branch 404 comprises one or more receiver amplifiers 416 to receive a signal from the radiating element contact pad 414 and deliver an amplified signal to a receiver contact pad 418.

Transmitter/receiver switches 420 and 422 control the input and output of signals going to and coming from the radiating element contact pad 414. In at least one embodiment, a shunt switch 424 allows leakage RF power from the receiver switch 422 to pass through, and to a ground via a shunt resistance 426, while the circuit 400 is in a transmit mode (the transmitter switch 420 in an on state while the receiver switch is in an off state). The signal from the shunt switch 424 may pass through one or more attenuators 428 and 430 to a phase comparator 432; the attenuators 428 and 430 are configured to reduce crosstalk between the shunt switch 424 and the transmitter branch 402. The phase comparator 432 also receives a corresponding signal from the transmitter contact pad 406 via a current filtering capacitor 434. The phase comparator 432 identifies any disparity in the phase of a signal actually produced at the radiating element contact pad 414 as compared to the signal applied to the transmitter contact pad 406. The phase comparator 432 may then apply a corrective signal to one of the one or more transmitter amplifiers 408, 410, and 412 to negate the disparity. The corrective signal may comprise a signal to adjust the gate bias of one or more of the transmitter amplifiers 408, 410, and 412. In some embodiments, the phase comparator 432 may be embodied in a phase-locked loop (PLL).

In one embodiment, the one or more attenuators 428 and 430 are separated from the transmitter branch 402 by an isolation distance 432 sufficient to prevent signals in the transmitter branch 402 from interfering in the phase comparison. The isolation distance may be 30 dB or greater.

In one embodiment, a circuit 400 is useful for identifying various failure states. There are many potential failure mechanisms that may cause elements of ESA to fail. ESAs and ESA radiating elements 436 can fail due to discontinuity between the transmitter amplifiers 408, 410, and 412 and the transmitter switch 420; discontinuity between the receiver switch 422 and the transmitter switch 420; discontinuity between the radiating element contact pad 414 and the remainder of the circuit 400; failure of circuitry (not shown) driving the transmitter switch 420 and receiver switch 422; and load impedance at the radiating element contact pad 414 due to changing operational conditions or degradation of the circuit board.

By comparing signals sampled from the shunt switch 424 to the transmitter contact pad 406, the circuit 400 may accurately detect any of these failures. A deviation in amplitude between the shunt switch 424 signal as compared to the transmitter contact pad 406 signal can identify discontinuities between the transmitter amplifiers 408, 410, and 412 and the transmitter switch 420; discontinuities between the receiver switch 422 and the transmitter switch 420; and discontinuities between the radiating element contact pad 414 and the remainder of the circuit 400. Regarding failures of the transmitter switch 420 and receiver switch 422 driving circuitry, a deviation in amplitude may only be a marginal difference of 2.5 dB-4.5 dB; however such a failure may produce a deviation in phase of between 8 degrees and 17 degrees, which is clearly detectable by the phase comparator 432.

Over the lifetime of the circuit 400, load impedance experienced by the transmitter amplifiers 408, 410, and 412 may change due to degradation. Load impedance changes can be detected over time by tracking the phase and amplitude of sampled signals at the shunt switch 424 and the transmitter contact pad 406. A circuit according to at least one embodiment may thereby determine whether the radiating element 436 and the contact pads 406, 414, and 418 are still functional within specified parameters.

Figure 5:
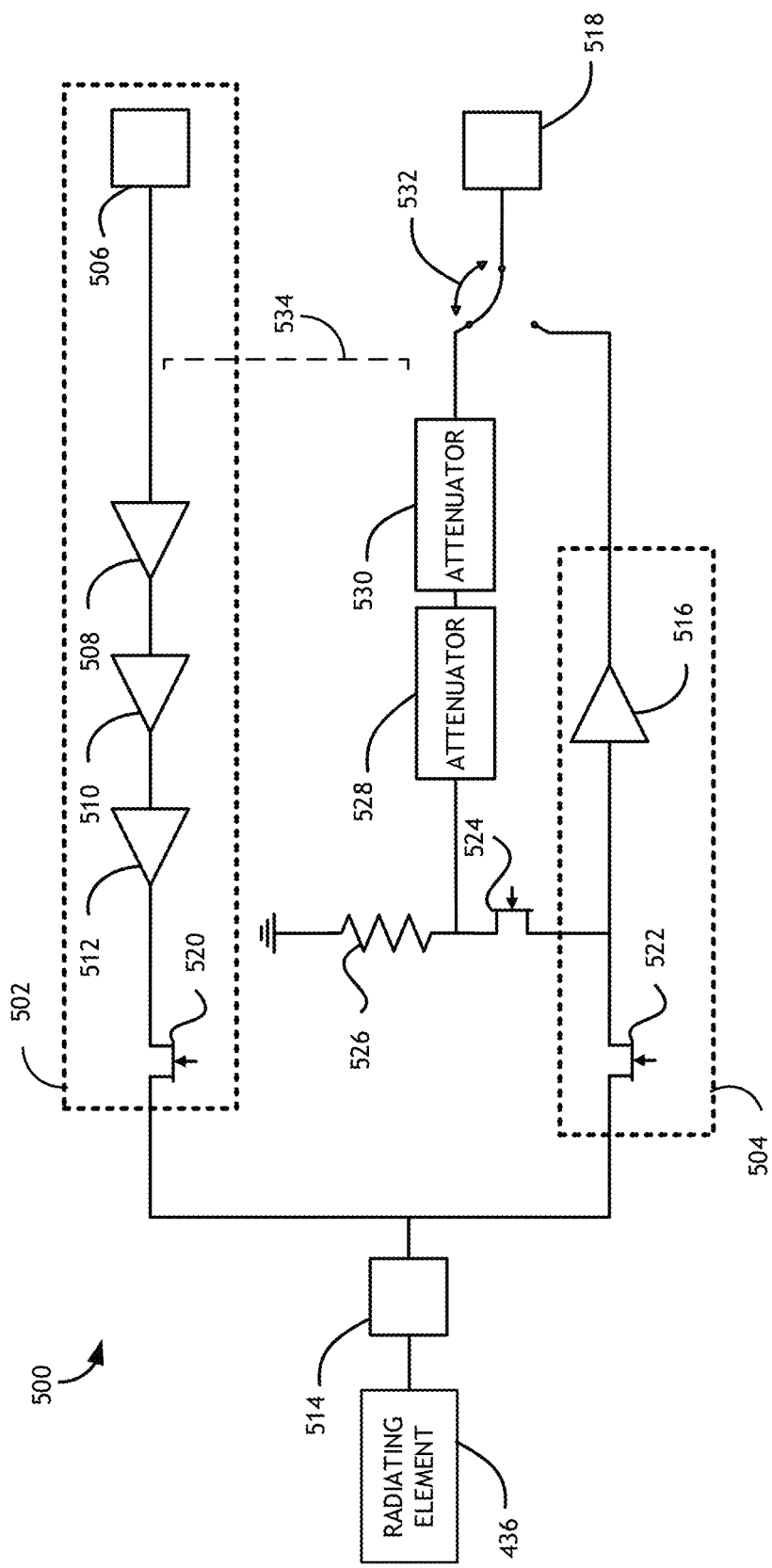
FIG. 5 shows a diagram of another circuit according to one embodiment of to the inventive concepts disclosed herein.

Referring to FIG. 5, a diagram of another circuit 500 according to one embodiment of to the inventive concepts disclosed herein is shown. The circuit comprises a transmitter branch 502 and a receiver branch 504. The transmitter branch 502 receives signals to transmit via a transmitter contact pad 506; such signal received via the transmitter contact pad 506 is amplified by one or more transmitter amplifiers 508, 510, and 512. The amplified signal is delivered to a radiating element contact pad 514, and thereby applied to a connected radiating element to produce a desired radiation pattern in concert with other radiating elements in an ESA. The receiver branch 504 comprises one or more receiver amplifiers 516 to receive a signal from the radiating element contact pad 514 and deliver an amplified signal to a receiver contact pad 518.

Transmitter/receiver switches 520 and 522 control the input and output of signals going to and coming from the radiating element contact pad 514. In at least one embodiment, a shunt switch 524 allows leakage current from the receiver switch 522 to pass through, and to a ground via a shunt resistance 526, while the circuit 500 is in a transmit mode (the transmitter switch 520 in an on state while the receiver switch 522 is in an off state). The signal from the shunt switch 524 may pass through one or more attenuators 528 and 530 to a sampling switch 532; the attenuators 528 and 530 configured to reduce crosstalk between the shunt switch 524 and the transmitter branch 502. The signal sampling switch 532 allows a processing element connected to the transmitter contact pad 506 and receiver contact pad 518 to analyze any disparity in the phase of a signal actually produced at the radiating element contact pad 514 as compared to the signal applied to the transmitter contact pad 506 and apply a correction to signals applied to the transmitter contact pad 506 to negate the disparity.

In one embodiment, the one or more attenuators 528 and 530 are separated from the transmitter branch 502 by an isolation distance 534 sufficient to prevent signals in the transmitter branch 502 from interfering in the phase comparison.

Embodiments according to the inventive concepts disclosed herein allow sampling of transmitter/receiver power without degrading either transmitter or receiver performance. Some embodiments provide very high sensitivity with no false negative results. Furthermore, while the exemplary embodiments described herein specifically apply to ESA systems, the principles are also applicable to any system utilizing signal phase interferometry.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages. The form herein before described being merely an explanatory embodiment thereof, it is the intention of the following claims to encompass and include such changes.

What is claimed is:

1. A communication system comprising:
   at least one processor;
   a memory coupled with the at least one processor storing processor executable code;
   an electronically scanned array antenna (ESA) coupled with the at least one processor, the ESA comprising a plurality of radiating elements, at least one of the plurality of radiating elements associated with radiating element circuitry configured to operate in a transmit mode, the radiating element circuitry comprising:
   a transmitter branch;
   a receiver branch; and
   a shunt switch connected to the receiver branch, the shunt switch configured to sample leakage current from the receiver branch when the radiating element circuitry is operating in the transmit mode,
   wherein the processor executable code is configured to instruct the at least one processor to:
   generate a transmission signal having a first phase;
   apply the transmission signal to the transmitter branch;
   receive a sample signal having a second phase from the shunt switch;
   compare the second phase of the sample signal to the first phase of the transmission signal;
   identify a phase disparity between the second phase of the sample signal and the first phase of the transmission signal; and
   apply a phase correction to the transmission signal based on the phase disparity.

2. The communication system of claim 1, wherein the radiating element circuitry further comprises one or more attenuators connected to the shunt switch.

3. The communication system of claim 2, wherein the radiating element circuitry further comprises a phase comparator connected to the one or more attenuators and the transmitter branch.

4. The communication system of claim 3, wherein:
   the transmitter branch comprises at least one power amplifier; and
   the phase comparator is further connected to the at least one power amplifier, and configured to apply a signal to the at least one power amplifier to adjust a phase of a transmission signal.

5. The communication system of claim 1, wherein the processor executable code is further configured to instruct the at least one processor to compare the sample signal to the transmission signal to identify one or more faults in the radiating element circuitry.

6. The communication system of claim 1, further comprising a data storage element coupled with the processor, the data storage element storing base line radiating element phase calibration reference values.

7. A mobile platform including a communication system comprising:
   at least one processor;
   an electronically scanned array antenna (ESA) coupled with the at least one processor, the ESA comprising a plurality of radiating elements, at least one of the plurality of radiating elements associated with radiating element circuitry configured to operate in a transmit mode, the radiating element circuitry comprising:
   a transmitter branch;
   a receiver branch;
   a shunt switch connected to the receiver branch, the shunt switch configured to sample leakage current from the receiver branch when the radiating element circuitry is operating in the transmit mode;
   one or more attenuators connected to the shunt switch; and
   a phase comparator connected to the one or more attenuators and the transmitter branch.

8. The mobile platform of claim 7, wherein:
   the transmitter branch comprises at least one power amplifier; and
   the phase comparator is further connected to the at least one power amplifier, and configured to apply a signal to the at least one power amplifier to adjust a phase of a transmission signal.

9. The mobile platform of claim 7, further comprising:
   a memory coupled with the at least one processor storing processor executable code configured to instruct the processor to:
   generate a transmission signal having a first phase;
   apply the transmission signal to the transmitter branch;
   receive a sample signal having a second phase from the shunt switch;
   compare the second phase of the sample signal to the first phase of the transmission signal;
   identify a phase disparity between the second phase of the sample signal and the first phase of the transmission signal; and
   apply a phase correction to the transmission signal based on the phase disparity.

10. The mobile platform of claim 9, wherein the processor executable code is further configured to instruct the at least one processor to compare the sample signal to the transmission signal to identify one or more faults in the radiating element circuitry.

11. The mobile platform of claim 7, wherein the transmitter branch and the shunt switch are separated by a distance sufficient to provide at least 30 dB of isolation.

12. An apparatus for applying signals to a radiating element in an electronically scanned array antenna (ESA) comprising:
   a transmitter branch;
   a receiver branch;
   a shunt switch connected to the receiver branch, the shunt switch configured to sample leakage current from the receiver branch when the radiating element is in a transmit mode; and a sampling switch connected to the shunt switch and the receiver branch, the sampling switch configured to alternate an output between the shunt switch and the receiver branch.

13. The apparatus of claim 12, further comprising one or more attenuators connected to the shunt switch.

14. The apparatus of claim 13, further comprising a phase comparator connected to the one or more attenuators and the transmitter branch.

15. The apparatus of claim 14, wherein the phase comparator comprises a phase-locked loop.

16. The apparatus of claim 14, wherein:
the transmitter branch further comprises at least one power amplifier; and
the phase comparator is further connected to the at least one power amplifier, and configured to apply a signal to the at least one power amplifier to adjust a phase of a transmission signal and thereby adjust the directionality of a signal transmitted from the ESA.

17. The apparatus of claim 14, wherein:
the transmitter branch further comprises at least one power amplifier; and
the phase comparator is further connected to the at least one power amplifier, and configured to apply a signal to adjust a gate bias of at least one power amplifier to adjust a phase of a transmission signal.

* * * * *